Patented July 2, 1940

2,206,758

UNITED STATES PATENT OFFICE 2,206,758

PARASITICIDAL PREPARATION

William P. ter Horst, Packanack Lake, N. J., assignor to United States Rubber Company, New York, N. Y., a corporation of New Jersey No Drawing. Application July 7, 1939, Serial No. 283,194

2 Claims. (Cl. 167—22)

This invention relates to improvements in parasiticidal preparations.

This case is a continuation-in-part of application Sr. No. 234,956, filed Oct. 14, 1938, now Patent Number 2,181,217, dated Nov. 28, 1939.

It has been found that while the reaction product of acetonyl acetone and ammonium thiocyanate as described in the above copending case is a potent fungicide and insecticide, it has two disadvantages: The dust causes violent sneezing to operators and, when applied to plants in the form of a dust or spray, plant injury is apt to result. It has now been found that a paste, prepared with water and thickener together with a suitable wetting agent and a suitable hygroscopic agent greatly reduces plant injury and tendency to cause sneezing.

A preferred composition is made up as follows, the parts being by weight:

| | Per cent |
|---|---|
| Acetonyl acetone—ammonium thiocyanate reaction product | 40 |
| Bentonite | 4 |
| Santomerse D (wetting agent supplied by Monsanto Chemical Company) | .2 |
| Dipotassium phosphate in the form of a 60% water solution | 3.6 |
| Water | 52.2 |

This paste is further diluted with water in the approximate proportions of one pound to ten pounds per 100 gallons of water.

Instead of bentonite, other thickeners may be used. The main function of the bentonite is to render the paste stable during transit and storage and to stabilize the spray liquor. Other thickeners such as, for example, karayagum, agar agar, silica gel, Darvan, etc., may be used. The amount should be so chosen so as to stabilize the paste and the final spray without rendering the paste too stiff for easy handling.

Instead of Santomerse, other suitable wetting agents may be used. The function of the wetting agent is to facilitate formation of the paste and to facilitate redispersion of the parasiticide after it has been dried out on the plants. The amount should be chosen as to render the parasiticide wettable. Too much wetting agent is undesirable, inasmuch as it will cause the removal of the parasiticide from the plant during a period of rain.

Instead of dipotassium phosphate, other suitable hygroscopic agents may be used such as, for example, glycerol, sorbitol, diethyleneglycol, and the like. The function of the hygroscopic agent is to reduce or eliminate tendency to cause sneezing. Dipotassium phosphate, in addition to being a stronger hygroscopic agent than for example, glycerol, also functions as a buffering agent, thereby reducing or eliminating plant injury caused by the parasiticides. Instead of dipotassium phosphate other buffering agents that may be used are disodium phosphate, monopotassium or sodium phosphate, trisodium or potassium phosphate, sodium bicarbonate and the like.

The proportions given above are by way of example only and it is understood the proportions may be varied without departing from the principle of the invention disclosed herein.

Having thus described my invention, what I claim and desire to protect by Letters Patent is:

1. A parasiticidal preparation containing as an active constituent a product of reaction of acetonyl acetone with ammonium thiocyanate in the form of a paste containing in addition a thickener, a wetting agent, and a hygroscopic agent.

2. A parasiticidal preparation containing as an active constituent a product of reaction of acetonyl acetone with ammonium thiocyanate in the form of a paste containing in addition bentonite, a wetting agent, and dipotassium phosphate.

WILLIAM P. TER HORST.